Sept. 28, 1954  G. W. KING  2,690,197
ROTARY COMMINUTING AND SEPARATING DEVICE
Filed Oct. 4, 1950
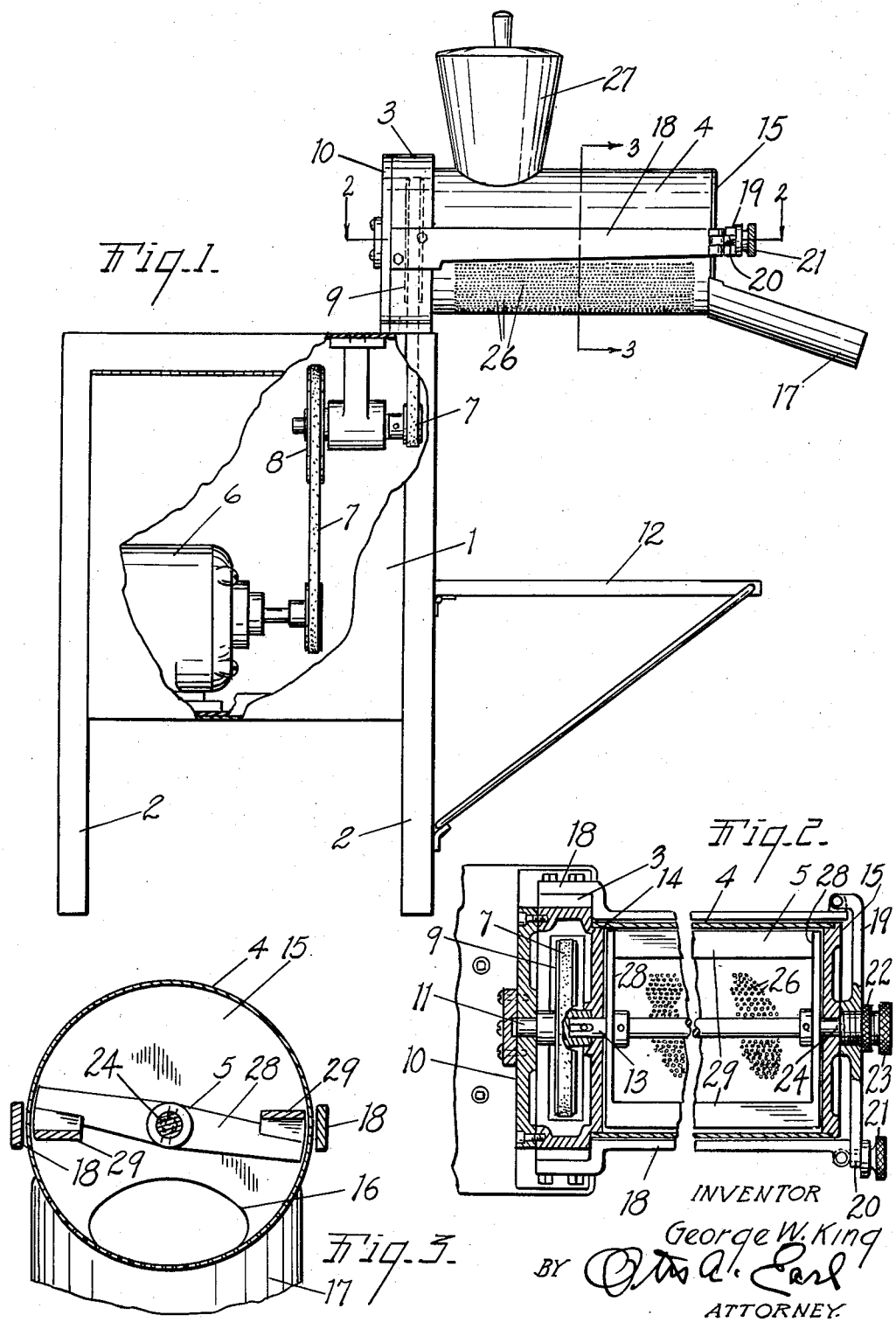
INVENTOR
George W. King
BY [signature]
ATTORNEY Patented Sept. 28, 1954

2,690,197

UNITED STATES PATENT OFFICE 2,690,197

ROTARY COMMINUTING AND SEPARATING DEVICE

George W. King, Grand Rapids, Mich., assignor to Rex Manufacturing Company, Grand Rapids, Mich.

Application October 4, 1950, Serial No. 188,429

4 Claims. (Cl. 146—76)

This invention relates to improvements in rotary comminuting and separating device.

The principal objects of this invention are:

First, to provide an automatically operating power driven device for removing the skins and seeds and other undesirable portions of fruit and vegetables and comminuting the remainder of the food for further preparation or consumption.

Second, to provide a device that will separate the skins from boiled potatoes and deliver the body of the potato in comminuted or riced form.

Third, to provide a device for separating the skins, seeds and cores of apples from the bodies thereof and delivering the remainder of the fruit in a comminuted pulped condition.

Fourth, to provide a device for separating the skins and seeds of tomatoes from the remainder thereof and delivering the body of the vegetable in juiced finely divided form.

Fifth, to provide a device which will effectively separate the undesirable portions of tomatoes, apples, potatoes and the like from the bulk of the food and deliver the food in a desirable comminuted form.

Sixth, to provide a food comminuting device which is highly effective and easily disassembled for thorough cleaning of its parts.

Other objects and advantages relating to details of my invention will be apparent from a consideration of the following description and claims. The drawings, of which there is one sheet, illustrate a preferred form of my comminuting device.

Fig. 1 is a side elevational view, partially broken away, illustrating my device in operative position.

Fig. 2 is a fragmentary horizontal cross sectional view taken along the plane of the line 2—2 in Fig. 1.

Fig. 3 is a vertical cross sectional view through the barrel and impeller of my device taken along the plane of the line 3—3 in Fig. 1.

My device consists of a cabinet-like base 1 supported on suitable legs 2. Along the front of the top of the base there is provided an upright housing 3 which forms a support for a tubular cylindrical barrel 4 and a double bladed impeller 5 mounted within the barrel. A motor 6 mounted within the base is connected by means of the belts 7 and speed reducing pulleys 8 to a drive pulley 9 mounted within the upright 3. A cover plate 10 closes the rear open side of the upright and forms a rear bearing for the shaft 11 of the pulley 9. A collapsible shelf 12 is hingedly connected to the front of the base to support a food receiving pan below the barrel 4.

More specifically the forward wall of the upright 3 is apertured to receive the slotted end 13 of the impeller shaft which is drivingly engaged with a pin carried in a socket in the forward end of the pulley shaft 11. The forward wall of the upright 3 is outwardly shouldered concentric with the impeller shaft 13 as at 14 so as to receive and support the rear or inner end of the barrel 4. A closure plate 15 removably fits within the front end of the barrel 4 and defines a central opening for receiving the forward or outer end of the impeller shaft 13. The closure plate 15 further defines a waste discharge opening 16 (see Fig. 3) along its lower side and carries a waste chute 17 projecting forwardly from the machine.

In order to support the front closure plate and the front of the barrel from the upright 3, a pair of forwardly extending parallel support arms 18 are secured to the upright and project forwardly to the end of the barrel. A cross bar 19 is pivotally secured to one of these support arms and is slotted at its other end to cooperate with the swinging screw 20 and nut 21 for clamping the crossbar to the support arms. The mid section of the crossbar carries a lock nut 22 and a bearing nut 23 is threaded through the lock nut in opposition to the end of the impeller shaft 13. A ball thrust bearing 24 carried by the rear end of the bearing nut engages and supports the outer end of the impeller shaft.

The underside of the barrel 4 is substantially continuously perforated by a multiplicity of closely spaced small bores 26. Desirably the bores 26 are of a size corresponding to a No. 44 to No. 46 drill. The top of the barrel 4 near the rear end thereof is provided with a feed opening to which the hopper 27 is permanently attached. The impeller 5 includes the end radius arms 28 on which the diametrically opposed impeller blades 29 are mounted. The blades 29 are closely spaced from the inner surface of the barrel 4. The blades 29 are given a slight outward spiral lagging in the direction of rotation of the impeller so that food entering the barrel through the hopper 27 is repeatedly carried by the impeller blades around the inside of the barrel to strip the fruit or pulp of the food from the skin and seeds thereof and force the edible portions through the holes 26 while the undesired portions are advanced to the waste opening 16.

I am aware that machines having somewhat similar operating parts have previously been devised for the same general purpose as my machine. However, there are certain critical relationships between the elements of my machine, which will now be described, which render it highly efficient and desirable where previous machines have failed to effectively accomplish their designed purpose. In the first place, I would like to point out that there is a definite relationship between the diameter of the barrel 4 and the speed of the impeller at which the machine will be highly effective. If the diameter of the barrel s approximately six inches the rotational speed of the impeller should be between 280 and 310 R. P. M. with 300 R. P. M. most desired. A faster rotation causes the food articles to be thrown around the barrel at such a rate that the skin and other objectionable portions are not separated from the body of the food. If the speed of the impeller is reduced substantially below 280 R. P. M. the pieces of food are not forced against the openings 26 with sufficient force to comminute the food. It will be noted that these desirable speeds result in the example illustrated in a peripheral speed of the impeller blades between 438 feet per minute and 485 feet per minute with the optimum peripheral speed being 470 feet per minute.

The spacing of the outer edges of the impeller blades from the inner surface of the barrel is also important and should be maintained between 1/32 and 1/64 of an inch. This spacing permits potato, tomato and apple skins, seeds and stems to pass between the impeller blades and the barrel without being forced out through the holes 26. At the same time, chunks or particles of the food being comminuted will be thrown against the apertured underside of the barrel with a sufficient centrifugal force to progressively force portions of the particles through the apertures.

The pitch of the impeller blades is also important in obtaining a complete separation of the skin, seeds and other undesirable portions of the food from the body of the food prior to discharge of the objectionable portions through the discharge opening 16. I have found that a ten degree pitch or angle between the impeller blades and an element of the cylindrical surface generated thereby assures that all of the edible portions of the food will be separated from the seeds, skin, etc. before the skin is advanced through the opening 16. A substantially higher pitch of the impeller blades will result in edible food being discharged through the opening 16 and a substantally lower pitch will result in both the food and skins remaining in the barrel for an undue length of time. Retention of the skins in the barrel for a greater time than is necessary will result in some shredding of the skins and seeds and the passage thereof through the openings 26. The rate of advance of food along the barrel may of course be modified or controlled independently of the pitch of the blades by tilting the barrel but I prefer the structure described.

For thicker skinned fruits and vegetables, such as oranges, the spacing of the impeller blades from the inner surface of the barrel should be increased to slightly greater than the thickness of the skin. My device may then be used for pulping or juicing oranges and similar articles.

I have thus described a highly practical form of my food comminuting device. I have not attempted to illustrate other modifications of the machine as it is believed that persons skilled in the art may adapt it to such other related uses and structures as may fall within the scope of the following claims, or reproduce and use the same without further disclosure.

Having thus described my invention, what I claim as new and desire to secure by Letters Patent is:

1. A food comminuting device comprising a base having a motor mounted therein, a chambered upright mounted on top of said base and having an axially outwardly extending cylindrical shoulder on one side thereof, a tubular barrel slidably and removably received on said shoulder to hang over the side of said base, said barrel having a multiplicity of small bores through its underside, a pulley rotatably mounted within said upright and having a drive shaft concentric with said barrel, an impeller having a shaft removably and drivingly connected with said drive shaft, said impeller being positioned in said barrel and having diametrically opposed blades closely spaced from the inner surface thereof, said blades being pitched slightly to advance food toward the outer end of said barrel, a closure plate removably received in the outer end of said barrel and defining a discharge opening along the bottom thereof, said plate further forming a central aperture receiving the outer end of said impeller shaft, a pair of support arms connected to opposite sides of said upright and extending therefrom alongside of said barrel, a crossbar pivotally connected to the outer end of one of said support arms and swingable across the outer end of said barrel, releasable clamping means on the other of said support arms engageable with said crossbar, an adjustable thrust bearing carried by said crossbar and engageable with said impeller shaft, means drivingly connecting said pulley with said motor to rotate said impeller blades at between 438 and 485 feet per minute, and means for introducing food to be comminuted into the end of said barrel remote from said closure plate.

2. A food comminuting device comprising a base having a motor mounted therein, a chambered upright mounted on top of said base and having an axially outwardly extending cylindrical shoulder on one side thereof, a tubular barrel slidably and removably received on said shoulder to hang over the side of said base, said barrel having a multiplicity of small bores through its underside, a pulley rotatably mounted within said upright and having a shaft concentric with said barrel, an impeller having a shaft removably and drivingly connected with said pulley, said impeller being positioned in said barrel and having diametrically opposed blades closely spaced from the inner surface thereof, said blades being pitched slightly to advance food toward the outer end of said barrel, a pair of support arms connected to opposite sides of said upright and extending therefrom alongside of said barrel, a crossbar pivotally connected to the outer end of one of said support arms and swingable across the outer end of said barrel, releasable clamping means on the other of said support arms engageable with said crossbar, an adjustable thrust bearing carried by said crossbar and engageable with said impeller shaft, means drivingly connecting said pulley with said motor to rotate said impeller blades at between 438 and 485 feet per minute, and means for introducing food to be comminuted into the end of said barrel remote from said bearing.

3. A food comminuting device comprising a base having a motor mounted therein, an upright mounted on top of said base and having a cylindrical shoulder on one side thereof, a tubular barrel slidably and removably engaged with said shoulder in spaced relationship with said base, said barrel having a multiplicity of small bores through its underside, a drive wheel rotatably mounted on said upright and having a shaft concentric with said barrel, an impeller having a shaft removably and drivingly connected with said wheel, said impeller being positioned in said barrel and having blades closely spaced from the inner surface thereof, a closure plate removably received in the outer end of said barrel and defining a discharge opening along the bottom thereof, said plate further forming a central aperture receiving the outer end of said impeller shaft, a pair of support arms connected to opposite sides of said upright and extending therefrom alongside of said barrel, a crossbar pivotally connected to the outer end of one of said support arms and swingable across the outer end of said barrel, releasable clamping means on the other of said support arms engageable with said crossbar, a bearing carried by said crossbar and engageable with said impeller shaft, means drivingly connecting said wheel with said motor to rotate said impeller at between 280 and 310 revolutions per minute, and means for introducing food to be comminuted into the inner end of said barrel.

4. A food comminuting device comprising a base having a motor mounted therein, an upright mounted on top of said base and having a cylindrical shoulder on one side thereof, a tubular barrel approximately 6″ in diameter slidably and removably engaged with said shoulder in spaced relationship with said base, said barrel having a multiplicity of small bores through its underside, a drive wheel rotatably mounted on said upright and having a shaft concentric with said barrel, an impeller having a shaft removably and drivingly connected with said wheel, said impeller being positioned in said barrel and having blades closely spaced from the inner surface thereof, a pair of support arms connected to opposite sides of said upright and extending therefrom alongside of said barrel, a crossbar pivotally connected to the outer end of one of said support arms and swingable across the outer end of said barrel, releasable clamping means on the other of said support arms engageable with said crossbar, a bearing carried by said crossbar and engageable with said impeller shaft, means drivingly connecting said wheel with said motor to rotate said impeller at between 280 and 310 revolutions per minute, and means for introducing food to be comminuted into the inner end of said barrel.

References Cited in the file of this patent

UNITED STATES PATENTS

| Number | Name | Date |
|---|---|---|
| 372,591 | Beggs | Nov. 1, 1887 |
| 941,073 | Iitsuka | Nov. 23, 1909 |
| 1,262,530 | Lowe | Apr. 9, 1918 |
| 1,263,834 | Allen | Apr. 23, 1918 |
| 1,750,764 | Schaefer | Mar. 18, 1930 |
| 2,088,657 | Lindley | Aug. 3, 1937 |
| 2,101,620 | Lewis | Dec. 7, 1937 |
| 2,477,620 | Kerr | Aug. 2, 1949 |

FOREIGN PATENTS

| Number | Country | Date |
|---|---|---|
| 610,996 | France | June 26, 1926 |